(12) United States Patent
Wahler et al.

(10) Patent No.: US 8,918,756 B2
(45) Date of Patent: Dec. 23, 2014

(54) GENERATING CONSTRAINTS IN A CLASS MODEL

(75) Inventors: Michael S. Wahler, Zurich (CH); Jana Koehler, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 13/456,745

(22) Filed: Apr. 26, 2012

(65) Prior Publication Data

US 2012/0272211 A1  Oct. 25, 2012

Related U.S. Application Data (63) Continuation of application No. 12/201,828, filed on Aug. 29, 2008, now abandoned.

(30) Foreign Application Priority Data

Sep. 13, 2007 (EP) ..................................... 07116302

(51) Int. Cl.
*G06F 9/44* (2006.01)

(52) U.S. Cl.
CPC ... *G06F 8/10* (2013.01); *G06F 8/35* (2013.01)
USPC .......................................................... 717/106

(58) Field of Classification Search
USPC .......................................................... 717/106
See application file for complete search history.

(56) References Cited

U.S. PATENT DOCUMENTS 7,478,419 B2 * 1/2009 Anderson et al. .................. 726/1
8,700,378 B1 * 4/2014 Lin .................................. 703/14
2001/0037496 A1 * 11/2001 Simonyi ............................. 717/7
2005/0010922 A1 1/2005 Czajkowski et al.
2005/0027542 A1 2/2005 Bordawekar et al.
2006/0225061 A1 * 10/2006 Ludwig et al. ................. 717/161
2008/0208648 A1 8/2008 Linder et al.

OTHER PUBLICATIONS

Brucker, Achim D., Wahler, M. & Basin, D., Consistency of OCL Specifications, submitted for publication 2007.
Wahler, Michael, , Koehler, J. & Brucker, A.D.., Model-Driven Constraint Engineering, Electronic Communications of the EASST, 2006.
Chiorean, Dan, Bortes, M. & Corutiu, D., Proposals for a Widespread Use of OCL, Proceedings of the MoDELS'05 Conference Workshop on Tool Support for OCL and Related Formalisms—Needs and Trends, Montego Bay, Jamaica, Oct. 4, 2005, pp. 68-82.
Kleppe.A.; Warmer, J. & Bast, W., MDA Explained. The Model Driven Architecture: Practice and Promise, Publisher: Addison-Wesley, 2003.

* cited by examiner

*Primary Examiner* — John Chavis
(74) *Attorney, Agent, or Firm* — Suiter Swantz pc llo (57) ABSTRACT

A method of generating code from a class model for a modeled system. The class model specifies a plurality of elements of a modeling language and dependencies between elements of a plurality of elements. In operations the method analyzes the class model to identify a first possible source of underspecification with respect to the modeled system in the class model by using pattern recognition to find an occurrence of a first problem pattern of a plurality of problem patterns in the class model, the plurality of problem patterns are then stored in a repository. The method also includes identifying a set of constraint patterns where the at least first constraint pattern is linked in the repository to the first problem pattern. A user may then select a constraint pattern which is utilized in instantiating constraints and generating code based on the class model and the instantiated constraints.

19 Claims, 5 Drawing Sheets

GENERATING CONSTRAINTS IN A CLASS MODEL

CROSS-REFERENCE TO RELATED APPLICATIONS

The present application is a continuation of application Ser. No. 12/201,828, filed Aug. 29, 2008 entitled "Generating Constraints in a Class Model," which claims the benefit under 35 U.S.C. §119 of EP; Application Serial Number 07116302.6, filed Sep. 13, 2007 entitled "Generating Constrains in a Class Model." Said U.S. application Ser. No. 12/201,828 and EP Application Serial Number 07116302.6 are hereby incorporated by reference in their entirety.

TECHNICAL FIELD

The invention relates to a method for generating code from a class model.

BACKGROUND

Modeling languages such as the unified modeling language provide a variety of model types for describing properties of a modeled system. A class model models the underlying data model of a system in an object oriented manner. A class model specifies elements of modeling languages and dependencies between the elements. Class models have diagrammatic syntax and therefore allow people without skills in computer science to model data.

The limited expressiveness of diagrammatic models often means that class models produced by graphical specification are often under-specified with respect to the system modeled. The term under-specified is used here to indicate that instances of the model can exist which do not conform to objects in the modeled system. Textual constraints are therefore used to express details that are either difficult or impossible to express diagrammatically. Thus in the development of code from a class model, constraints are helpful to make the model consistent with the modeled system.

Figure 1:
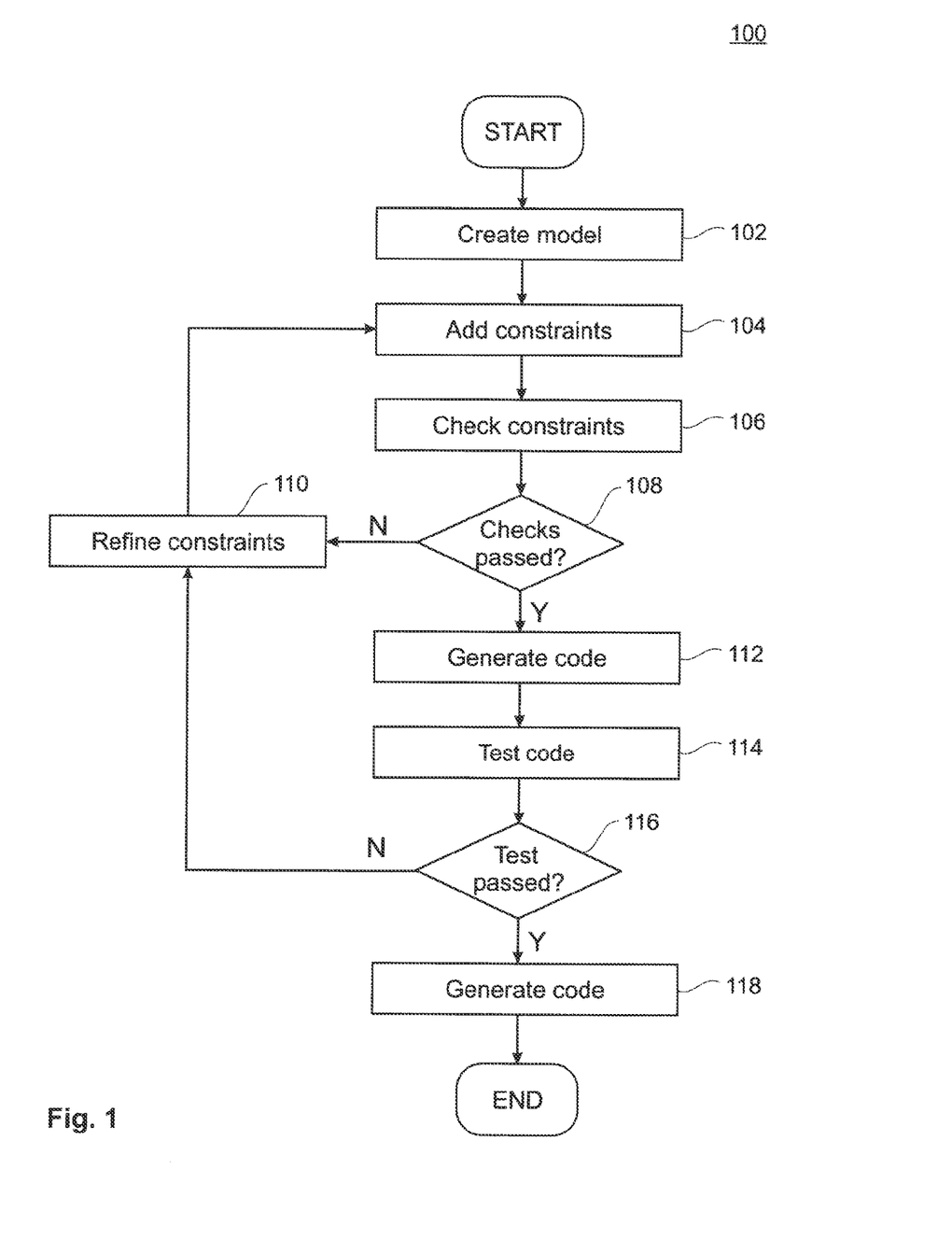
FIG. 1 shows a flow diagram illustrating a constraint development process.

FIG. 1 shows a flow diagram illustrating the steps involved in the state of the art development process 100. In a step 102, a model is created. This can be performed graphically by a model developer. In a step 104 constraints are added to the model. The step 104 is carried out by a constraints expert. In a step 106, the constraints are checked for correct syntax and types. If the checks are not passed in a step 108, the constraints are refined in a step 110 and potentially new constraints are added in step 104. If the checks are passed in step 108, the method moves to a step 112 in which code is generated from the model and the constraints. In a step 114, the generated code is tested. The knowledge of a test expert is used for the test code step 114. The step 114 checks that the constraint specification for the model is valid. If the test is not passed, in a step 116 the method moves back to step 110 in which the constraints are refined. If the test in step 114 is passed, the method moves from step 116 to a step 118 in which the code is deployed.

The development process 100 shown in FIG. 1 uses the expertise of a constraint expert and a test expert in addition to the knowledge of the model developer.

SUMMARY

The present invention is directed to a method, data processing system, and computer program product as defined in the independent claims. Further embodiments of the invention are described in the dependent claims.

According to an embodiment of the present invention, there is provided a method of generating code from a class model for a modeled system. The class model specifies a plurality of elements of a modeling language and dependencies between the elements. The method comprises analyzing the class model to identify a first possible source of under-specification with respect to the modeled system. Pattern recognition is used to find an occurrence of a first problem pattern of a plurality of problem patterns in the class model. The plurality of problem patterns is stored in a repository. The method further comprises identifying a set of constraint patterns comprising at least a first constraint pattern. The at least first constraint pattern is linked in the repository to the first problem pattern. The first constraint pattern is a resolution to the first possible source of under-specification in the class model. The method further comprises presenting, e.g. by means of displaying, the set of constraint patterns to a user. The method further comprises receiving a user selection from the user. The user selection comprises a constraint pattern from the set of constraint patterns. The method further comprises instantiating constraints from the user selection. The method further comprises generating code based on the class model and the instantiated constraints.

Embodiments of the invention are advantageous as potential constraints for the class model are automatically identified and presented to a user. Thus, the expertise of a constraints expert is not required for the generation of constraints.

According to an embodiment of the present invention, the step of identifying a set of constraint patterns further comprises determining conflicts between constraints in the class model and constraint patterns in the set of constraint patterns. Embodiments of the present invention are particularly advantageous as potential conflicts between constraints are identified before the constraints are instantiated. This means that potential conflicts between constraints are identified without the need for the step of testing the code which is shown as step 114 in FIG. 1. Thus, embodiments of the present invention allow a development process without the need for a cycle such as that shown in FIG. 1 where the step 110 may need to be repeated a number of times. Embodiments of the invention therefore provide an efficient development process as the load upon processing resources is minimized.

According to a preferred embodiment of the present invention, the set of constraint patterns are selected from a constraint pattern repository storing parameterizable constraint patterns.

According to a preferred embodiment of the present invention, the parameterizable constraint patterns are stored with information about potential conflicts and redundancies with other constraint patterns.

According to a preferred embodiment of the present invention, the parameterizable constraint patterns are parameterizable by moving, e.g. by dragging and dropping, elements of the plurality of elements into parameter slots of the parameterizable constraint patterns. Embodiments of the present invention therefore provide user-friendly constraint pattern instantiation.

According to a preferred embodiment of the present invention, the step of presenting the set of constraint patterns to a user further comprises presenting a context, a description, and potential resolution alternatives as a table to the user. The context is an identifier of the element in the plurality of elements associated with the first possible source of under-specification, the description describes the first possible source of under-specification, and the potential resolution alternatives are identifiers of the at least first constraint pattern.

According to a preferred embodiment of the present invention, there is provided a computer program product. The computer program product comprises computer-executable instructions. The instructions are adapted, when executed on a computer, to cause the computer to perform the steps of the method in accordance with the invention.

According to a preferred embodiment of the present invention, there is provided a data processing system for generating code from a class model for a modeled system.

BRIEF DESCRIPTION OF THE DRAWINGS

In the following, embodiments of the invention will be described in greater detail by way of example only making reference to the drawings in which.

DETAILED DESCRIPTION

Figure 2:
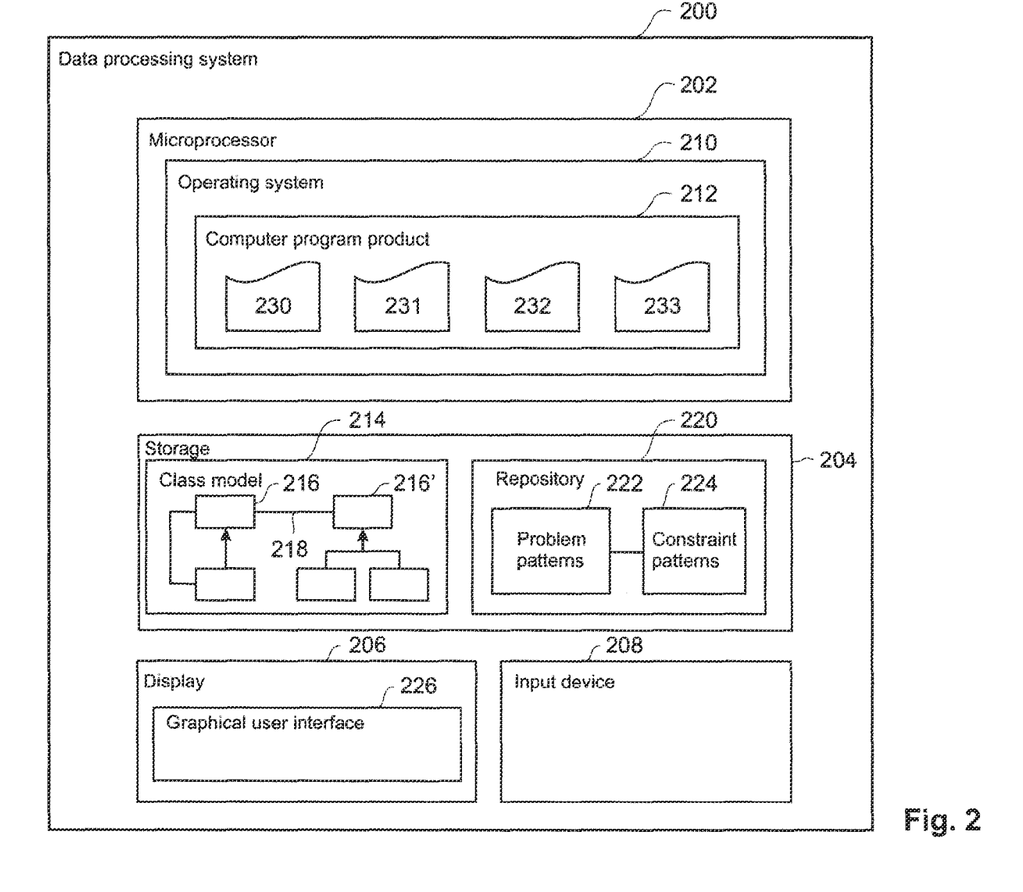
FIG. 2 shows a block diagram of a data processing system.

FIG. 2 shows a block diagram of a data-processing system 200. The data-processing system 200 comprises a microprocessor 202, storage 204, a display 206 as output device, and an input device 208. Microprocessor 202 executes an operating system 210. The operating system 210 is used to execute a computer program product 212. The codes of the operating system 210 and of the computer program product 212 are stored on the storage 204, and loaded for execution onto the microprocessor 202.

Computer program product 212 works as a code generator tool for generating code from a class model. An example of a class model is shown in FIG. 3.

Storage 204 stores a class model 214 and a repository 220. Class model 214 specifies a number of elements 216, 216', and the relationships 218 between the elements. The repository 220 stores problem patters 222 and comprises links between these problem patterns and constraint patterns 224.

Display 206 displays a graphical user interface 226. A user may manipulate the graphical user interface 226 using input device 208. Input device 208 may comprise a keyboard, a mouse, or other input device.

Figure 3:
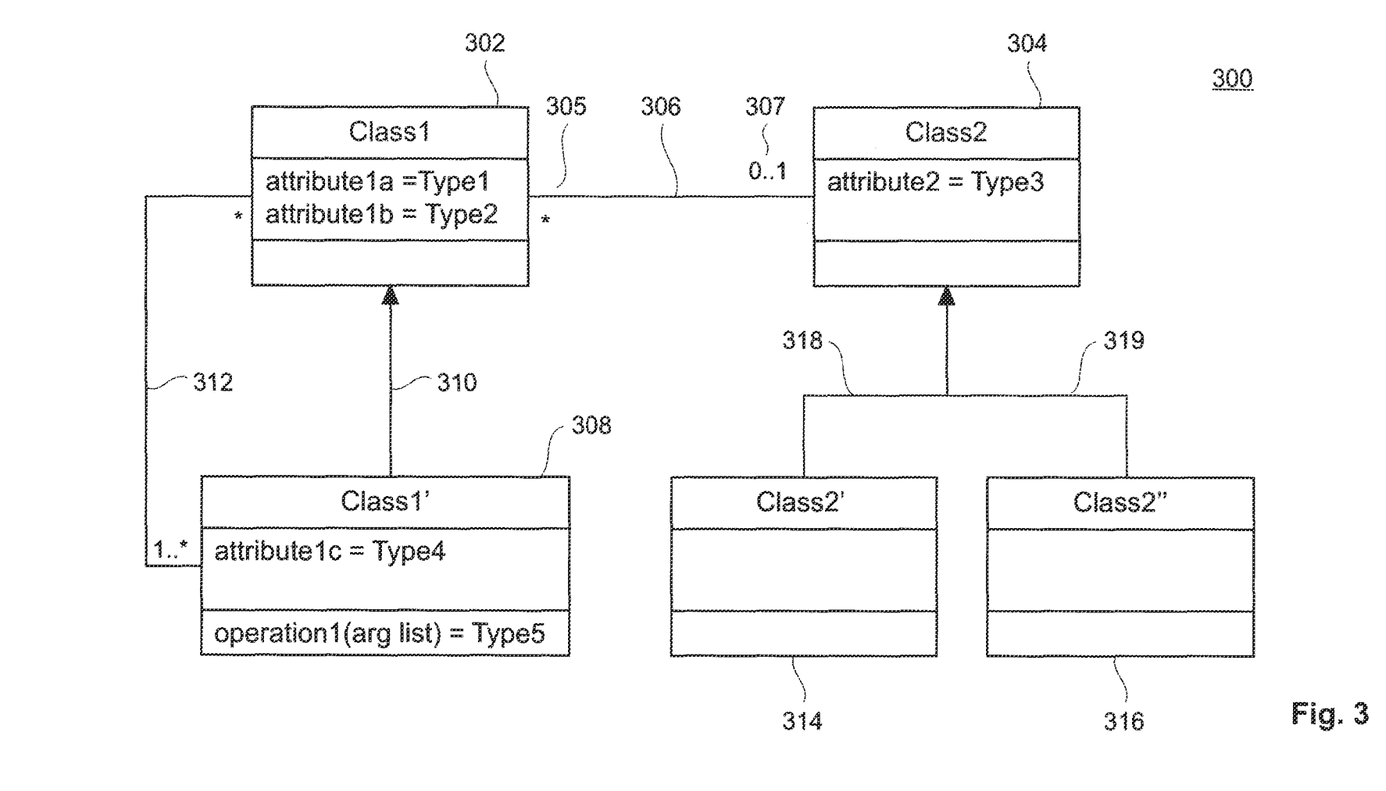
FIG. 3 shows schematically a class model.

FIG. 3 shows an example of a class model 300. Class model 300 contains classes 302, 304, 308, 314 and 316. Class 302 has attributes attribute1*a* and attribute1*b*. Class 304 has attribute attribute2. The relationship between the objects represented by class 302 and 304 is represented by association 306, which comprises properties 305 and 307. The multiplicities of the property 305 are shown by the symbol * which indicates that the multiplicity is unbound, and the multiplicities of the property 307 are shown by the interval 0 . . . 1 which indicates that the multiplicity can take either the value 0 or 1. Class 308 and class 302 have a super-class relationship 310 which indicates that class 308 is derived from class 302. Class 308 and class 302 have association 312. Classes 314 and 316 are derived from class 304. This is indicated by relationships 318 and 319. The classes shown in FIG. 3 may represent elements of a modeled system. The associations 306 and 312 would therefore represent relationships or dependencies between these elements.

Figure 4:
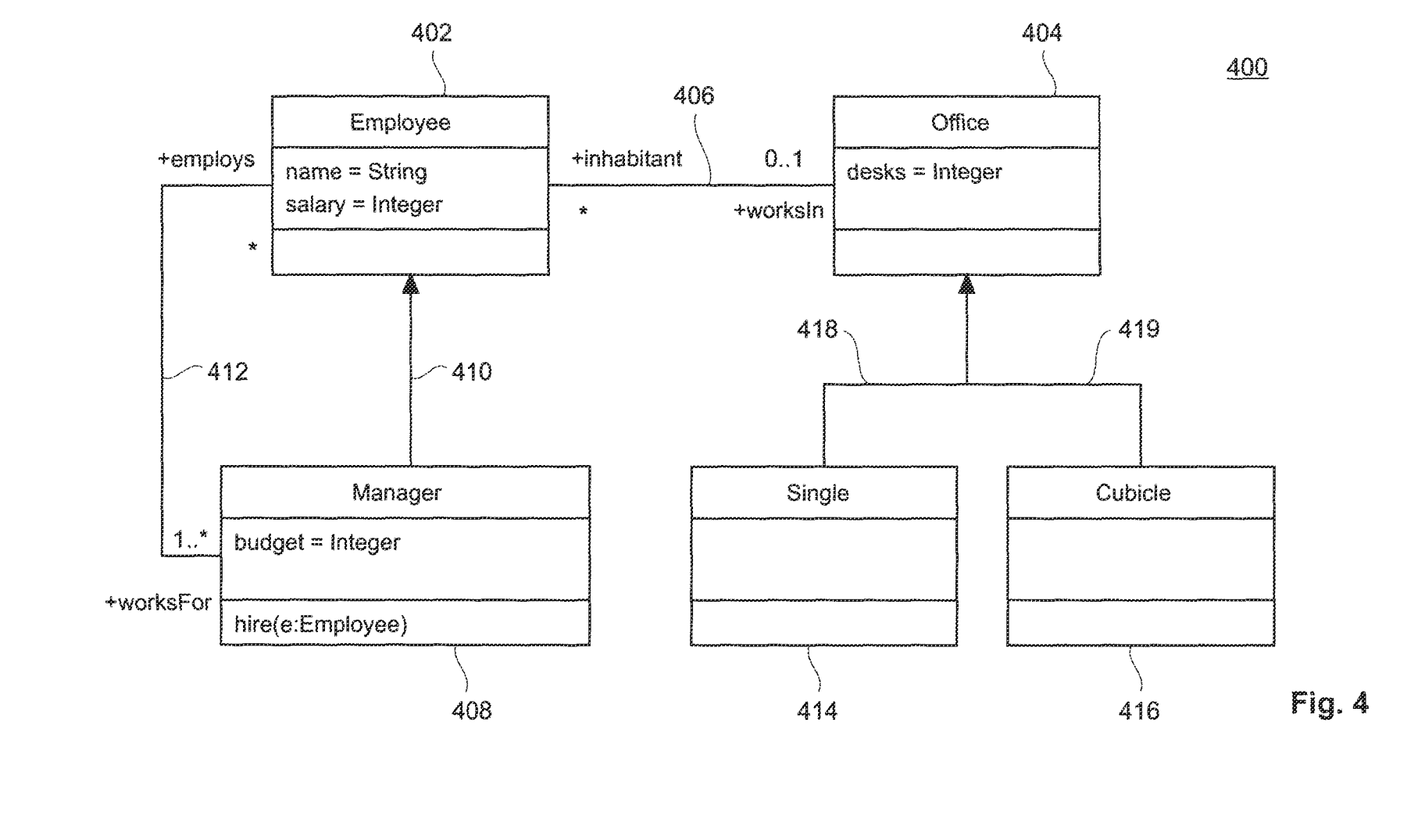
FIG. 4 shows schematically a class model of a company.

FIG. 4 shows an example of a class model of a company 400. The classes of company 400 are employee 402, office 404, manager 408, single 414, and cubicle 416. The class manager 408 is derived from the class employee 402. This is illustrated by dependency 410. Similarly the class single 414 and the class cubicle 416 are derived from the class office 404. This is indicated by dependencies 418 and 419. The relationship between the class employee 402 and the class office 404 is indicated by association 406. Office 404 has inhabitants which are employees from the class employee 402. The multiplicity of this relationship is unbound, meaning that the number of employees in an office is not limited. Employee 402 has a working relationship with office 404. The multiplicity of this relationship can either be 0 or 1, meaning that each employee can only work in either 0 offices or 1 office. The relationship between employee and manager is indicated by association 412. A manager 408 employs an employee 402. The multiplicity of this relationship is unbound. An employee 402 works for a manager 408. The multiplicity of this relationship ranges from 1 to unbound, meaning that an employee must have at least one manager but can have an unlimited number of managers.

The examples of class models 300 in FIGS. 3 and 400 in FIG. 4 show the elements and relationships and dependencies between elements that can be graphically displayed and specified in a modeling language. Modeled systems such as the company modeled by class model 400 may have constraints that cannot be specified graphically. A class model is called "under-specified" with respect to the system which it models if instances of the class model can be created which are not instances of the system modeled. To use an example in the company of the system according to class model 400 the number of inhabitants of an office may be limited by the number of desks in an office. Thus the multiplicity of the relationship 406 may not in fact be unbound but dependent upon an attribute of office 404. Thus a constraint upon the multiplicity of the relationship 406 would be to make the multiplicity dependent upon the number of desks in office 404.

Potential sources of under-specification in a class model comprise:

The multiplicity of an association
A restriction on property types
The existence of reflexive associations
A lack of unique object identifiers
Relations between class attributes An example of multiplicities of associations is the restriction on inhabitants of an office to the number of desks in that office. An example of a specification using property types is that only managers can occupy single offices, and managers cannot occupy cubicles. An example of a reflexive association is that a manager employs an employee, but a manager is an instance of an employee, therefore each manager must themselves have a manager. This creates two problems, one of cycles and the second that arbitrary path lengths may exist.

A further problem of under-specification is that unique object identifiers may not exist. For example there may be more than one employee with a particular name. A further potential source of under-specification is that in a system there may be relations between properties. For example in the company modeled by class model 400, the number of employees that a manager can employ may be limited such that the total salary of the employees must be less than the budget of the manager.

The sources of under-specification detailed above may be removed by constraining the class model, for example by adding a constraint on the multiplicity of an association based on an attribute. Constraints may be added on the sub-classes of a super-class which can be associated with sub-classes of another super-class. Arbitrary path lengths and cyclic dependencies between objects caused by reflexive associations can be avoided by adding a constraint on the reflexive association. Unique object identifiers can be created by for example including more than one attribute in an object identifier. Complex relations between attribute values can also be expressed by constraints.

Computer program product 212 of data processing system 200 is operable to analyze class model 214 by means of a class model analyzer 230 and to select problem patterns which are indicative of under-specification as discussed above, by means of a pattern selector 231. Problem patterns 222 are identified from repository 220. The problem patterns 222 are linked to constraint patterns 224. For each identified problem pattern 222, a constraint pattern or a number of constraint patterns 224 which are linked to the problem pattern 222 are suggested to the user and displayed via graphical user interface 226. The user can then use input device 208 to select the constraint for inclusion in the class model. Class model analyzer 230 and pattern selector 231 can be realized as modules of the computer program product 212.

Figure 5:
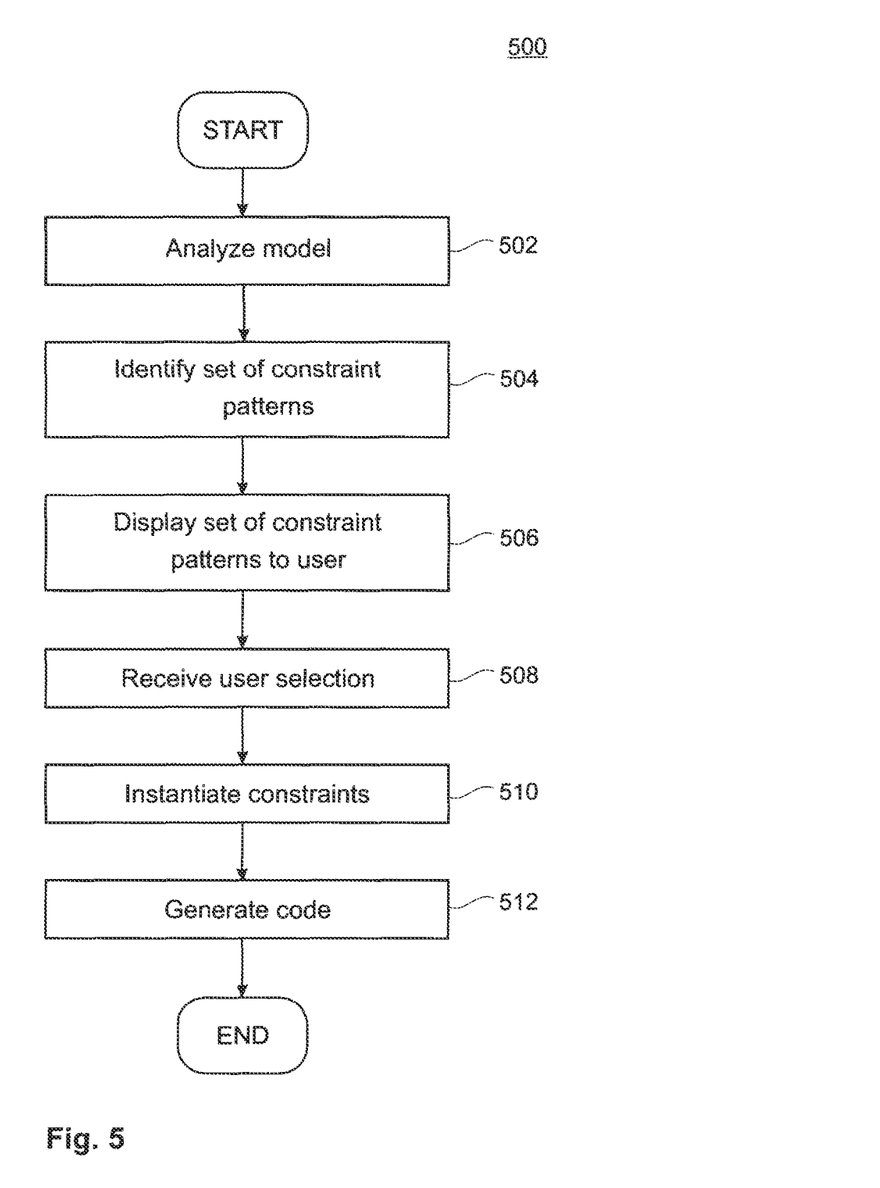
FIG. 5 shows a flow diagram illustrating steps performed in a method of generating code from a class model.

FIG. 5 shows a method 500 for generating code from a class model of a modeled system. In an analysis step 502, the model is analyzed. The analysis in step 502 comprises identifying problem patterns in the class model, thereby identifying a first possible source of under-specification with respect to the modeled system in the class model 214. This is done by comparing problem patterns 222 stored in a repository 220 with the class model 214, i.e. using pattern recognition to find an occurrence of the first problem pattern of the plurality of problem patterns 222 in the class model 214. In a selection step 504, a set of constraint patterns is identified. The constraint patterns are linked to the problem patterns 222 in the repository 220. More precisely a set of constraint patterns is identified comprising at least a first constraint pattern 224, which at least first constraint pattern 224 is linked in the repository 220 to the first problem pattern, wherein the at least first constraint pattern 224 is a resolution to the first possible source of under-specification in the class model 214.

In a presentation step 506, the set of constraint patterns are presented, i.e. displayed to the user. In a reception step 508, a user selection of one or more constraint patterns from the set of constraint patterns displayed to the user is received. In an instantiation step 510, one or more constraints are instantiated from the constraint patterns in the user selection, by means of an instantiator 232. In a step 512, code is generated based on the class model 214 and the one or more instantiated constraints. The code is generated in a code generation step 512 using a code generator 233. This code generator 233 can be embodied using methods and tools known in the art. Instantiator 232 and code generator 233 can be realized as modules of the computer program product 212.

The presentation step 506 and the reception step 508 can be omitted if the set of constraint patterns comprises only one constraint pattern 224. In this event, there would be the possibility for the system to assume that the user will want to execute the constrain pattern, and the constraint pattern 224 can be automatically selected for the instantiation step.

When there is more than one possible resolution for a problem pattern, the user may be shown a preview of possible constraint patterns. The user can select a constraint pattern to be instantiated and added to the model by for example double clicking using a mouse on an instance of a constraint pattern. When constraint patterns are presented to the user, conflicts between current constraints in the class model and the constraint pattern instances to be added may also be identified in the selection step 504 and be presented in the presentation step 506 to the user. The computer program product 212 in FIG. 2 may contain instructions such that conflicting constraint patterns cannot be instantiated unless the reason for the conflict is eliminated by the user.

The preview of possible constraint patterns may be presented to the user as a table. The table may comprise a context comprising an identifier of the element of the class model associated with the first possible source of under-specification, a description describing the first possible source of under-specification and potential resolution alternatives comprising identifiers of the at least first constraint pattern. The same is possible for the other sources of under-specification.

The repository 220 shown in FIG. 2 may comprise a constraint pattern library. This may be implemented in a tool such as IBM Rational Software Architect (RSA). The user may be able to choose one or more constraint patterns from the constraint pattern library and create instances of them by moving, e.g. dragging and dropping the constraint patterns into the model. The constraint patterns stored in the constraint pattern library may be parameterizable by moving model elements into parameter slots. The parameterizable constraint patterns can be stored with information about potential conflicts and redundancies with other constraint patterns.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A data-processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data-processing system to become coupled to other data processing systems or remote printers or storage devices through intervening private or public networks. Modems, cable modem and Ethernet cards are just a few of the currently available types of network adapters.

The invention claimed is:

1. A method for generating code from a class model for a modeled system, said class model specifying a plurality of elements of a modeling language, dependencies between and constraints on elements of said plurality of elements, the method comprising:

an analysis step for analyzing said class model to identify a first possible source of under-specification with respect to the modeled system in said class model by using pattern recognition to find an occurrence of a first problem pattern of a plurality of problem patterns in said class model, said plurality of problem patterns being stored in a repository;

a selection step for selecting a set of constraint patterns comprising at least a first constraint pattern, said at least first constraint pattern being linked in said repository to said first problem pattern, said at least first constraint pattern being a resolution to said first possible source of under-specification in the class model;

a presentation step for presenting said set of constraint patterns to a user;

a reception step for receiving a user selection from said user, said user selection comprising a selected constraint pattern from said set of constraint patterns;

an instantiation step for instantiating constraints from said selected constraint pattern; and a code generation step for generating code based on said class model and the instantiated constraints.

2. The method of claim 1, wherein the presentation step and the reception step are omitted if the set of constraint patterns comprises only one constraint pattern, and the constraint pattern is automatically selected.

3. The method of claim 2, wherein the presentation step (506) further comprises presenting a context, a description and potential resolution alternatives as a table to said user, wherein said context comprises an identifier of the element of said plurality of elements associated with said first possible source of under-specification, said description describes said first possible source of under-specification, and said potential resolution alternatives comprise identifiers of said at least first constraint pattern.

4. The method of claim 1, wherein the selection step further comprises determining conflicts between constraints in said class model and constraint patterns in said set of constraint patterns.

5. The method of claim 1, wherein said set of constraint patterns being selected from a repository storing parameterizable constraint patterns.

6. The method of claim 5, wherein said parameterizable constraint patterns are stored with information about potential conflicts and redundancies with other constraint patterns.

7. The method of claim 5, wherein said parameterizable constraint patterns are parameterizable by moving elements of said plurality of elements into parameter slots of said parameterizable constraint patterns.

8. A data-processing system for generating code from a class model for a modeled system, said class model specifying a plurality of elements of a modeling language and dependencies between elements of said plurality of elements, the data-processing system comprising:

a processor for implementing the functions below;

a class model analyzer for analyzing said class model to identify a first possible source of under-specification with respect to the modeled system in said class model by using pattern recognition to find an occurrence of a first problem pattern of a plurality of problem patterns in said class model, said plurality of problem patterns being stored in a repository;

a pattern selector for selecting a set of constraint patterns comprising at least a first constraint pattern, said at least first constraint pattern being linked in said repository to said first problem pattern, said at least first constraint pattern being a resolution to said first possible source of under-specification in the class model, the pattern selector further configured for determining whether there are any conflicts between constraints in the class model and the set of constraint patterns;

an output device for presenting one or more non-conflicting constraint patterns of the set of constraint patterns to a user upon determining by the pattern selector whether there are any conflicts between constraints in the class model and the set of constraint patterns;

an input device for receiving a user selection from said user, said user selection comprising a selected constraint pattern from a plurality of non-conflicting constraint patterns;

an instantiator for instantiating constraints from said selected constraint pattern, wherein the selected constraint pattern is to be instantiated and added to the class model using an instance of the selected constraint pattern; and a code generator for generating code based on said class model and the instantiated constraints.

9. The data-processing system of claim 8, wherein the presenting and the receiving are omitted if the set of constraint patterns comprises only one constraint pattern and the constraint pattern is automatically selected.

10. The data-processing system of claim 8, wherein said set of constraint patterns being selected from a repository storing parameterizable constraint patterns.

11. The data-processing system of claim 10, wherein said parameterizable constraint patterns are stored with information about potential conflicts and redundancies with other constraint patterns.

12. The data-processing system of claim 10, wherein said parameterizable constraint patterns are parameterizable by moving elements of said plurality of elements into parameter slots of said parameterizable constraint patterns.

13. The data-processing system of a claim 8 wherein the output device is further adapted for presenting a context, a description and potential resolution alternatives as a table to said user, wherein said context comprises an identifier of the element of said plurality of elements associated with said first possible source of under-specification, said description describes said first possible source of under-specification, and said potential resolution alternatives comprise identifiers of said at least first constraint pattern.

14. The data-processing system of claim 13, wherein the output device is further configured for presenting a preview of possible constraint patterns.

15. The data-processing system of claim 8, wherein the pattern selector is further configured for identifying conflicts between constraints in the class model and the set of constraint patterns.

16. A data-processing system configured for generating code from a class model for a modeled system, the data-processing system comprising:

a memory; and at least one processor, one or more of the at least one processor being coupled to the memory, the at least one processor being configured to execute instructions for:

comparing a plurality of problem patterns stored in a repository with the class model;
recognizing a particular problem pattern of the plurality of problem patterns within the class model;
identifying a particular source of under-specification in the class model with respect to the modeled system upon recognizing the particular problem pattern of the plurality of problem patterns in the class model;
identifying a set of constraint patterns which is linked to the particular problem pattern, each constraint pattern of the set of constraint patterns being a resolution to said particular source of under-specification in the class model;
determining whether there are any conflicts between constraints in the class model and the set of constraint patterns;
outputting a plurality of non-conflicting constraint patterns of the set of constraint patterns to a user upon determining whether there are any conflicts between constraints in the class model and the set of constraint patterns;
receiving a user selection, the user selection comprising a selected constraint pattern from the plurality of non-conflicting constraint patterns;
instantiating constraints from the selected constraint pattern, wherein the selected constraint pattern of the plurality of non-conflicting constraint patterns is to be instantiated and added to the class model using an instance of the selected constraint pattern; and
generating code based on the class model and the instantiated constraints.

17. The system of claim 16, wherein the at least one processor being configured to execute instructions for determining whether there are any conflicts between constraints in the class model and the set of constraint patterns further comprises the at least one processor being further configured to execute instructions for:
determining whether there are any conflicts between constraints in the class model and the set of constraint patterns prior to outputting any constraint pattern of the set of constraint patterns.

18. A computer program product comprising program code stored on a non-transitory computer readable storage medium configured for generating code from a class model for a modeled system, the program code configured for:
comparing a plurality of problem patterns stored in a repository with the class model;
recognizing a particular problem pattern of the plurality of problem patterns within the class model;
identifying a particular source of under-specification in the class model with respect to the modeled system upon recognizing the particular problem pattern of the plurality of problem patterns in the class model;
identifying a set of constraint patterns which is linked to the particular problem pattern, each constraint pattern of the set of constraint patterns being a resolution to said particular source of under-specification in the class model;
determining whether there are any conflicts between constraints in the class model and the set of constraint patterns;
outputting a plurality of non-conflicting constraint patterns of the set of constraint patterns to a user upon determining whether there are any conflicts between constraints in the class model and the set of constraint patterns;
receiving a user selection, the user selection comprising a selected constraint pattern from the plurality of non-conflicting constraint patterns;
instantiating constraints from the selected constraint pattern, wherein the selected constraint pattern of the plurality of non-conflicting constraint patterns is to be instantiated and added to the class model using an instance of the selected constraint pattern; and
generating code based on the class model and the instantiated constraints.

19. The computer program product of claim 18, wherein the program code configured for determining whether there are any conflicts between constraints in the class model and the set of constraint patterns further comprises the program code being further configured for:
determining whether there are any conflicts between constraints in the class model and the set of constraint patterns prior to outputting any constraint pattern of the set of constraint patterns.

* * * * *